United States Patent

[11] 3,596,750

| [72] | Inventors | Anthony L. Hendon<br>West Horsley, Surrey;<br>Christopher Richards, Horsham, Sussex,<br>both of, England |
|---|---|---|
| [21] | Appl. No. | 781,341 |
| [22] | Filed | Dec. 5, 1968 |
| [45] | Patented | Aug. 3, 1971 |
| [73] | Assignee | Telomex Group Limited<br>Horsham, Sussex, England |

[54] BELT CONVEYORS
15 Claims, 3 Drawing Figs.

| [52] | U.S. Cl. | 198/39 |
| [51] | Int. Cl. | B65g 69/00 |
| [50] | Field of Search | 198/39, 203 |

[56] References Cited
UNITED STATES PATENTS

| 3,205,958 | 9/1965 | Thompson | 198/39 |
| 3,351,179 | 11/1967 | Thompson | 198/203 |

*Primary Examiner*—Richard E. Aegerter
*Attorney*—Norris & Bateman

ABSTRACT: A belt conveyor especially designed for use in high speed weighing and comprising a carrier belt powered by a drive belt or belts in contact with part of the operative run of the carrier belt. In combination with a weighing platform the drive belt bypasses the platform and the carrier belt carries articles for weighing over the platform at a low tension.

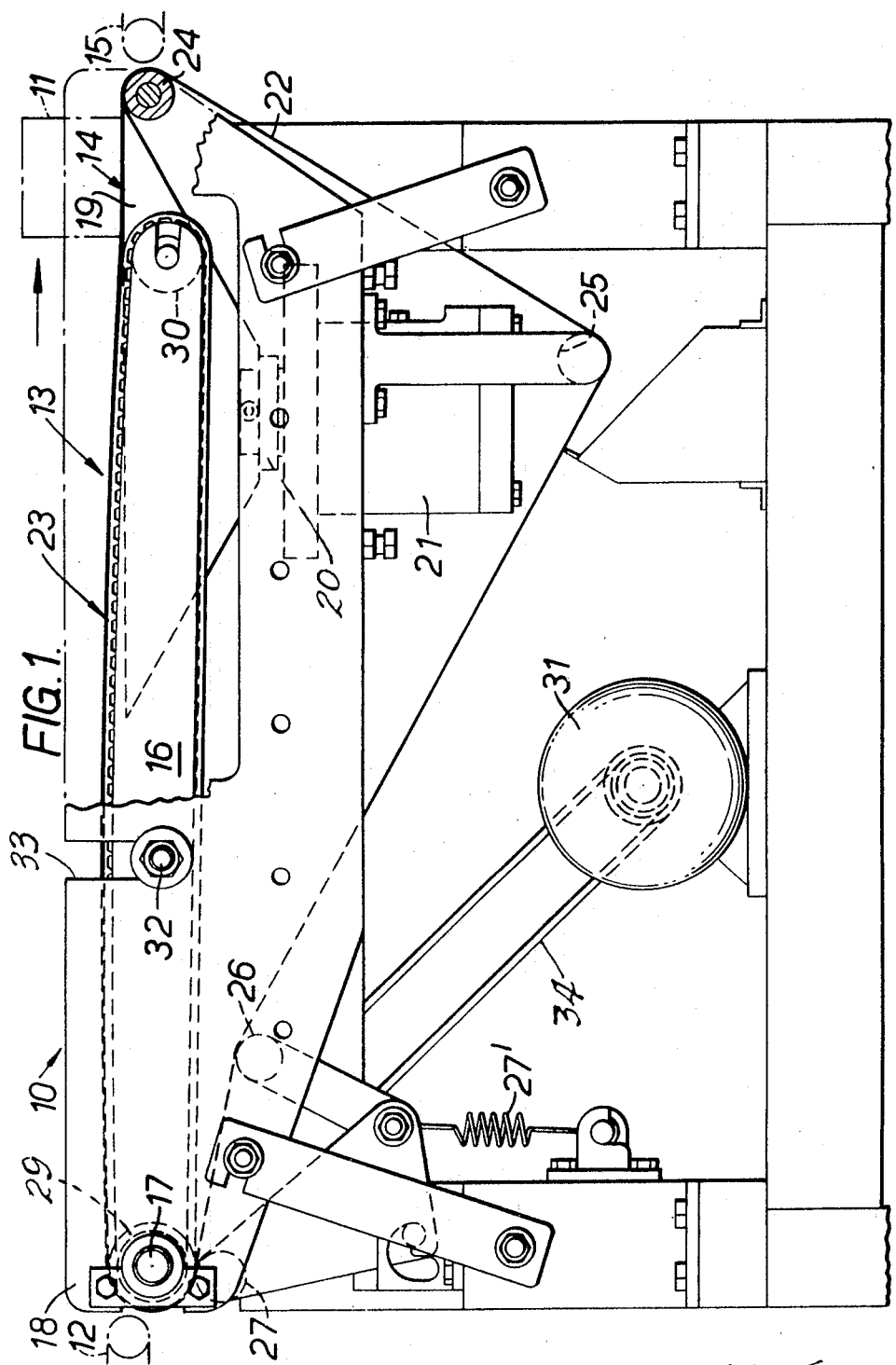

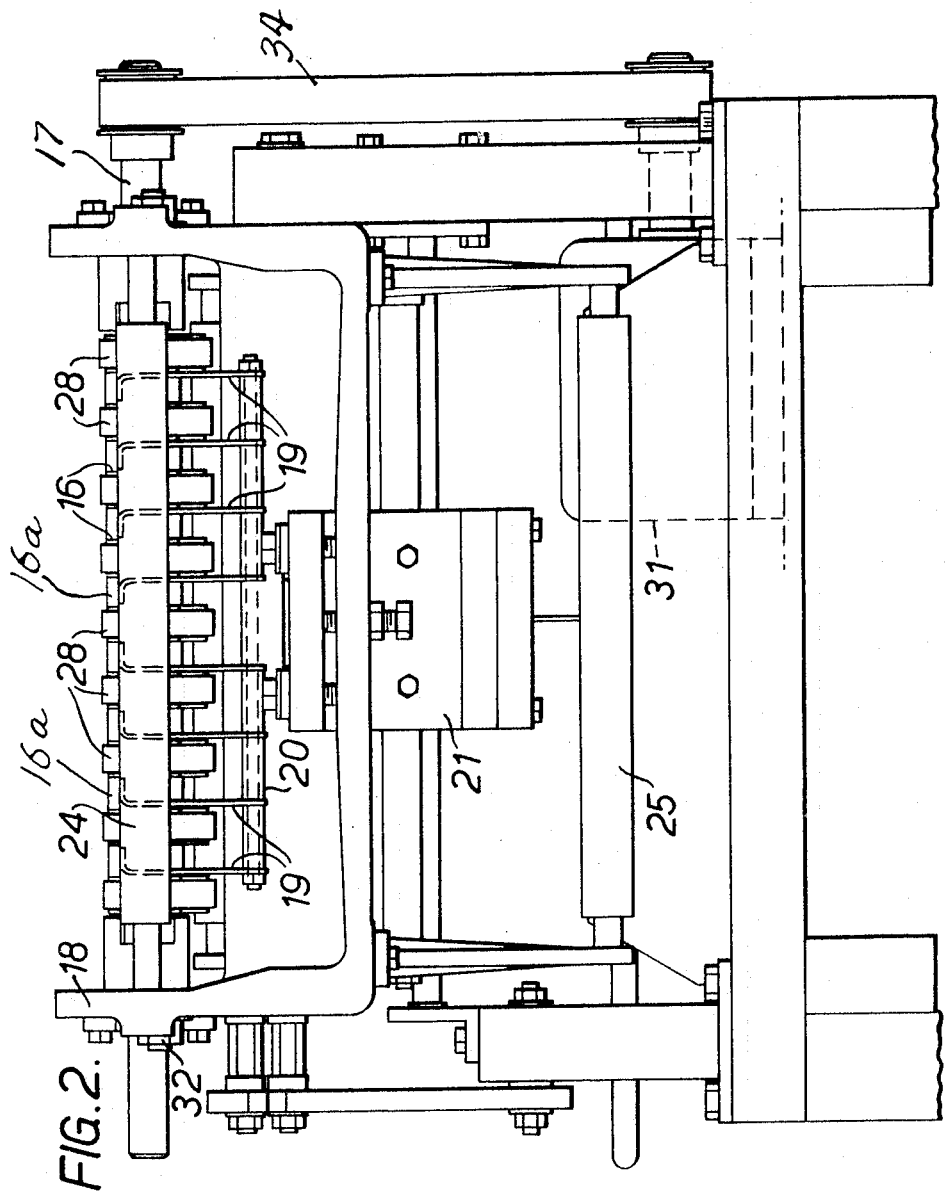

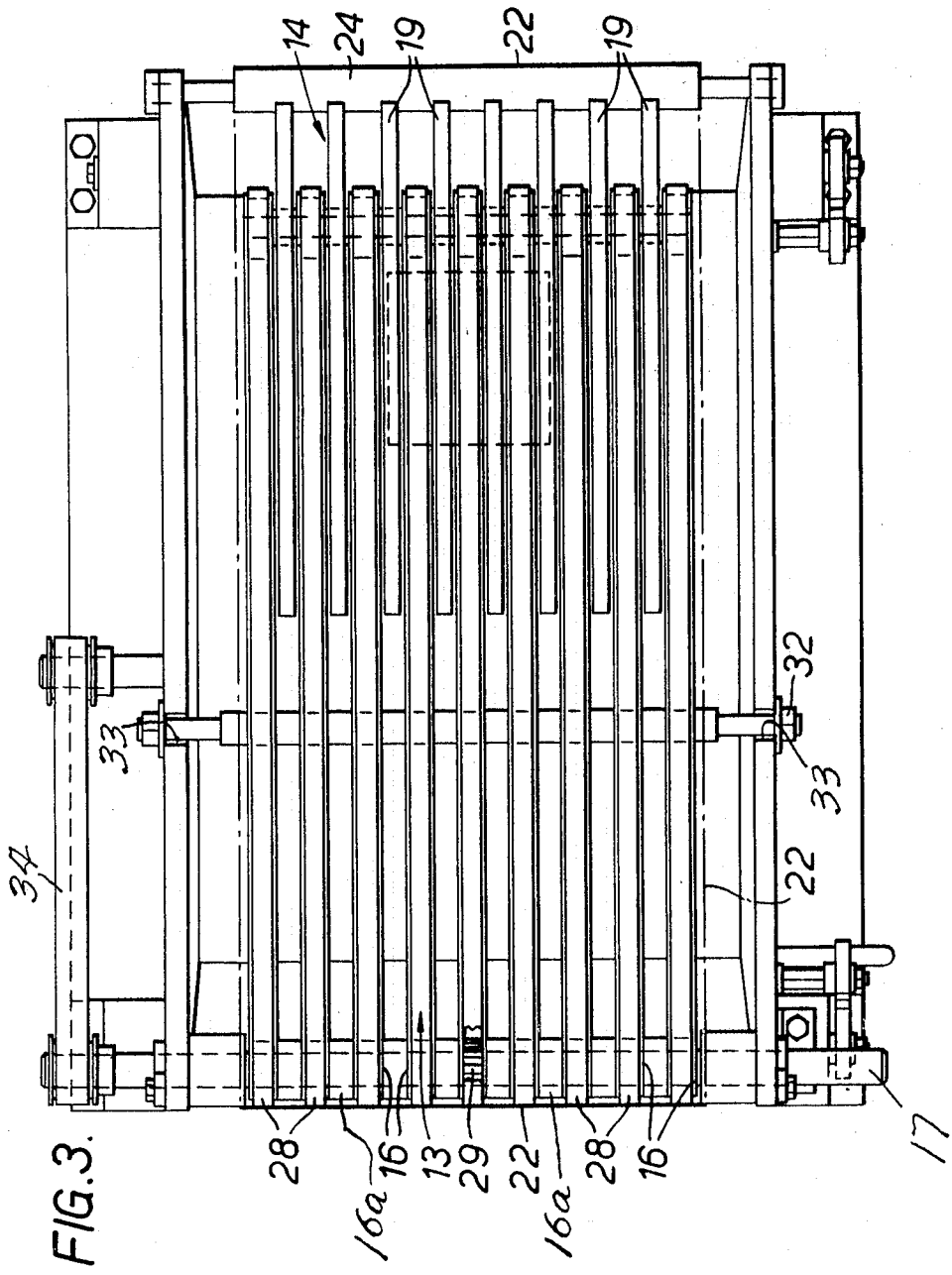

BELT CONVEYORS

This invention relates to belt conveyors and a principal object is to provide a conveyor on which a succession of articles may be passed over a weighing or other sensitive platform.

To this end, according to one aspect of the invention a conveyor comprises an endless carrier belt for the articles and a drive belt, which is itself driven from a prime mover and makes frictional engagement with portions of the underside of the carrier belt leaving a portion of the operative run of the latter which passes over the said platform unsupported and at a low tension which is substantially unaffected by articles carried on preceding and succeeding portions of the carrier belt.

Such a conveyor is particularly suitable for carrying articles across a weighing platform and enables the spacing of such articles on the conveyor to be reduced without affecting the accuracy of the weighing since the unsupported portion of the carrier belt may extend across the weighing platform and its tension is not increased by the articles in front of and behind the articles thereon, which are carried by supported and driven portions of the belt. This enables the articles to be weighed to be spaced with minimum gaps and so travel at lowest possible speed for a given throughput of articles, the low speed helping to increase the stability of the articles moving and the weighing accuracy, with reduction of wear in the conveyor belts and component parts.

It is a further aspect of the present invention to provide an adjustable length weighing platform which is particularly but not exclusively applicable for use with a belt conveyor of the kind herein described.

To this end, according to a further feature of the invention, there is provided weighing or other sensitive apparatus for use with a belt conveyor comprising a sensitive platform and an infeed or outfeed platform interlocking therewith, one of the platforms being angularly adjustable to vary the angle at which the platforms intersect and hence the length of the exposed surface of the sensitive platform.

A preferred embodiment of the invention will now be described with reference to the accompanying drawings in which:

FIG. 1 is a partly cutaway elevation of a weighing section of a belt conveyor including a weighing apparatus.

FIG. 2 is an end view of the conveyor section of FIG. 1.

FIG. 3 is a plan of the conveyor section of FIG. 1.

In FIG. 1 there is shown a weighing section 10 of a belt conveyor which receives cans or other articles 11 to be weighed from an incoming conveyor 12 on the left, transports them (in the direction of the arrow) over a feed platform 13 and a weighing platform 14 and delivers them to an outgoing conveyor 15 on the right.

The feed platform 13 consists of a series of fingers 16 or slats extending in the direction of conveying and loosely mounted by means of collars 16a on a shaft 17 rotatable about its axis at the infeed end of the section on a frame 18. The fingers 16 are supported centrally by a rod 32 vertically adjustable in a slot 33 in the frame 18.

The weighing platform 14 consists of a series of fingers 19 extending between the outgoing portions of the feed platform fingers 16 and fixed along their lower edges to a horizontal plate 20 which operates a weight transducer 21.

The cans 11 are carried over the section by a carrier belt 22, preferably of a polyester or other plastics sheet, or filled woven material. The carrier belt is supported over the feed platform by a drive belt 23 and passes unsupported over the weigh platform, over a roller 24 at the outgoing end of the section, round a roller 25 beneath the weigh transducer 21, over a tension arm 26 and back to the incoming end of the section by a pinch roller 27 held in tension against the belt by a tension spring 27'.

The drive belt 23 is formed of strips of rubber 28 which are toothed on their inner surfaces to engage toothed drive rollers 29 secured to the shaft 17 between collars 16a. The strips 28 carry the carrier belt 22 by frictional engagement, running between the drive rollers 29 and idlers 30 at the outgoing ends of the fingers. The upper surface of the fingers 16 is slightly convex to eliminate vibrations of the belt 22, and thus improve weighing accuracy. The drive rollers 29 are powered from a conventional motor 31 which drives the shaft 17 through a belt 34. As shown in FIG. 1 the pinch roller 27 and drive rollers 29 cooperate to drive the carrier belt 22 and ensure a feed of carrier belt at minimum tension to the feed platform as well as providing the tension to draw the cans across the weigh platform.

The pivoted support of the feed platform 13 enables it to be angularly adjusted by vertical adjustment of the central rod 32 and since the two platforms intersect at an angle this adjustment alters the length of the exposed surface of the weigh platform over which the carrier belt passes unsupported. The length of the weigh platform may thus be preselected according to the desired spacing of the cans, so that there is only one can on the weigh platform at the moment of weighing.

In alternative embodiments of the invention the weighing section 10 could be reversed so that the feed platform follows the weigh platform and is therefore an outfeed platform rather than an infeed platform. Alternatively the section could include infeed and outfeed platforms on either side of and intersecting a weigh platform and each carrying drive belts as described.

If desired the contact between the drive and carrier belts could be improved by using woven or indented belts chosen so that the weave or indentations of the belts match to provide a mechanical interlock.

Although a weigh platform has been described the invention is suitable for use with any equivalent form of sensitive platform.

We claim:

1. Continuous weighing apparatus comprising a weighing platform, a carrier belt for moving an article across the weighing platform and a stationary feed platform over which the belt moves and which is interleaved with the weighing platform, means for angularly adjusting said feed platform relative to the weighing platform to vary the angle at which the platforms intersect and hence the length of the carrier belt which is unsupported by the weighing platform.

2. Apparatus as claimed in claim 1, wherein the platforms comprise series of interlocking fingers.

3. Apparatus as claimed in claim 1, wherein the carrier belt is driven by a drive belt, which is itself driven from a prime mover and makes frictional engagement with portions of the underside of the carrier belt.

4. Apparatus as claimed in claim 3, wherein the carrier belt is made of a material selected from the group consisting essentially of polyester material and filled woven material.

5. A belt conveyor as claimed in claim 3, wherein the drive belt passes through and under the weighing platform before being led back to support the carrier belt.

6. A belt conveyor as claimed in claim 3, wherein the drive belt is driven by a toothed roller engaging teeth on the inner side of the drive belt.

7. A belt conveyor as claimed in claim 3, wherein the drive belt is of rubber.

8. A belt conveyor as claimed in claim 3, wherein the carrier belt is driven by a pinch roller drive.

9. A belt conveyor as claimed in claim 8, wherein the pinch roller drive comprises a roller cooperating with a roller providing the drive of the drive belt.

10. A belt conveyor as claimed in claim 3, wherein the drive belt comprises a series of spaced parallel strips.

11. A belt conveyor as claimed in claim 10, and including weighing or other sensitive apparatus as claimed in claim 2 wherein the drive belt strips pass over and round the fingers of the feed platform so that the carrier belt is unsupported as it passes over the exposed surfaces of the fingers of the sensitive platform.

12. A belt conveyor as claimed in claim 11, wherein the feed platform is on the infeed side of the sensitive platform.

13. A belt conveyor as claimed in claim 3, including a drive belt supporting the carrier belt on each side of the platform.

14. A belt conveyor as claimed in claim 3, wherein the carrier and drive belts are arranged so that there is a mechanical interlock therebetween provided by surface indentations of the weave of the material of the belts.

15. Apparatus as claimed in claim 1, wherein the feed platform is on the infeed side of the weighing platform.